(12) United States Patent
Tasi et al.

(10) Patent No.: US 8,518,166 B2
(45) Date of Patent: Aug. 27, 2013

(54) AIR FILTERING SYSTEM CAPABLE OF ENHANCING INSPECTION CONVENIENCE

(75) Inventors: Yuan-Shun Tasi, Taoyuan County (TW); Hsiu-Wei Lee, Taoyuan County (TW)

(73) Assignee: Atomic Energy Council-Institute of Nuclear Energy Research, Taoyuan County (TW)

( * ) Notice: Subject to any disclaimer, the term of this patent is extended or adjusted under 35 U.S.C. 154(b) by 358 days.

(21) Appl. No.: 12/880,279

(22) Filed: Sep. 13, 2010

(65) Prior Publication Data

US 2012/0060696 A1 Mar. 15, 2012

(51) Int. Cl.
*B01D 46/00* (2006.01)

(52) U.S. Cl.
USPC ...... 96/413; 55/385.2; 73/863.23; 73/863.81; 73/863.86

(58) Field of Classification Search
USPC ............ 73/864, 864.31, 864.33, 864.34, 73/864.63, 865.8; 96/413–416; 110/203–206, 110/216, 341, 342, 344, 345; 588/260
See application file for complete search history.

(56) References Cited

U.S. PATENT DOCUMENTS

| | | | | |
|---|---|---|---|---|
| 4,515,007 A | * | 5/1985 | Herman | 73/38 |
| RE31,952 E | * | 7/1985 | Wilcox et al. | 73/40.7 |
| 6,740,147 B2 | * | 5/2004 | Kishkovich et al. | 96/135 |
| 6,761,753 B2 | * | 7/2004 | Kishkovich et al. | 95/90 |
| 7,014,693 B2 | * | 3/2006 | Kishkovich et al. | 96/413 |
| 7,186,286 B2 | * | 3/2007 | Morse | 55/417 |
| 7,540,901 B2 | * | 6/2009 | Kishkovich et al. | 95/141 |
| 8,241,412 B2 | * | 8/2012 | Lin et al. | 96/413 |
| 2002/0078828 A1 | * | 6/2002 | Kishkovich et al. | 96/108 |
| 2002/0178923 A1 | * | 12/2002 | Kishovich et al. | 96/135 |
| 2004/0166679 A1 | * | 8/2004 | Kishkovich et al. | 438/689 |
| 2005/0051030 A1 | * | 3/2005 | Kishkovich et al. | 96/413 |
| 2005/0120775 A1 | * | 6/2005 | Grayfer et al. | 73/28.04 |
| 2005/0183490 A1 | * | 8/2005 | Grayfer et al. | 73/23.2 |
| 2008/0078289 A1 | * | 4/2008 | Sergi et al. | 95/25 |

* cited by examiner

*Primary Examiner* — Duane Smith
*Assistant Examiner* — Sonji Turner
(74) *Attorney, Agent, or Firm* — Rosenberg, Klein & Lee

(57) ABSTRACT

The present invention relates to an air filtering system capable of enhancing inspection convenience, which is disposed in the ceiling and comprises a housing, a filter, a first sampling tube, and a second sampling tube. On both ends of the housing, an intake and an outtake are disposed opposite to each other. The filter is disposed in the housing, and has an intake surface and an outtake surface opposite to each other. The filter divides the inner space of the housing into a first sampling zone and a second sampling zone. A first end of the first sampling tube is fixed on the housing, and communicates with the first sampling zone. Likewise, a first end of the second sampling tube is fixed on the housing, and communicates with the second sampling zone. Besides, a second end of the first sampling tube and a second end of the second sampling tube are both fixed on the wall. Thereby, the inspection convenience for the inspection staffs can be enhanced.

10 Claims, 3 Drawing Sheets

AIR FILTERING SYSTEM CAPABLE OF ENHANCING INSPECTION CONVENIENCE

FIELD OF THE INVENTION

The present invention relates generally to an air filtering system, and particularly to an air filtering system capable of enhancing inspection convenience.

BACKGROUND OF THE INVENTION

In biochemical laboratories, radiological medical laboratories, or high-tech factories, exhaust gases generally will be produced during the process of experiments or of manufacturing. The exhaust gases usually contain germs, radioactive materials, or toxic materials. Thereby, the exhaust gases have to be filtered by a filtering system before being exhausted to the atmosphere for avoiding polluting the environment. Accordingly, improvements on the design of air filtering systems have been an important direction of research in recent years.

The basic structure of an air filtering system according to the prior art comprises an intake, an outtake, a housing, and a filter. The outtake and the intake are connected on the opposite sides of the housing; the filter is disposed in the housing, and has an intake surface and an outtake surface opposite to each other. The filter divides the inner space of the housing into a first sampling zone and a second sampling zone. The first sampling zone is formed between the intake and the intake surface; and the second sampling zone is formed between the outtake and the outtake surface. In addition, a ventilator is disposed on the housing in the first sampling zone and in the second sampling zone, respectively.

In order to increase space utilization, air filtering systems are generally disposed in the ceilings. Thereby, when the inspection staffs sample and analyze the air before filtering (in the first sampling zone) and the air after filtering (in the second sampling zone), they have to climb up the stairs and insert a sampling tube into the ventilator for sampling, and then climb down the stairs and send the sample to an analyzer for analysis. Hence, the air filtering systems according to the prior art usually cause inconvenience and danger to inspection staffs.

Accordingly, the present invention provides a novel air filtering system capable of enhancing inspection convenience, which can avoid inconvenience and danger to inspection staffs caused by climbing up and down the stairs when they are sampling.

SUMMARY

An objective of the present invention to provide an air filtering system capable of enhancing inspection convenience, which samples the air in the air filtering system uniformly by reaching a sampling tube into a sampling zone instead of sampling through ventilators.

Another objective of the present invention to provide an air filtering system capable of enhancing inspection convenience, which uses a first sampling tube and a second sample tube both fixed on the wall for enhancing inspection convenience for inspection staffs.

The air filtering system capable of enhancing inspection convenience according to the present invention is disposed in the ceiling and comprises a housing, a filter, a first sampling tube, and a second sampling tube. On both ends of the housing, an intake and a corresponding outtake are disposed. The filter is disposed in the housing, and has an intake surface and an outtake surface opposite to each other. The filter divides the inner space of the housing into a first sampling zone and a second sampling zone. The first sampling zone is formed between the intake and the intake surface; and the second sampling zone is formed between the outtake and the outtake surface. A first end of the first sampling tube is fixed on the housing and communicates with the first sampling zone. Likewise, a first end of the second sampling tube is fixed on the housing, and communicates with the second sampling zone. Besides, a second end of the first sampling tube and a second end of the second sampling tube are both fixed on the wall. Thereby, the inspection convenience for the inspection staffs can be enhanced. When the inspection staffs need to sample, climbing up and down the stairs can be avoided, and hence preventing inconvenience and danger to the inspection staffs.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
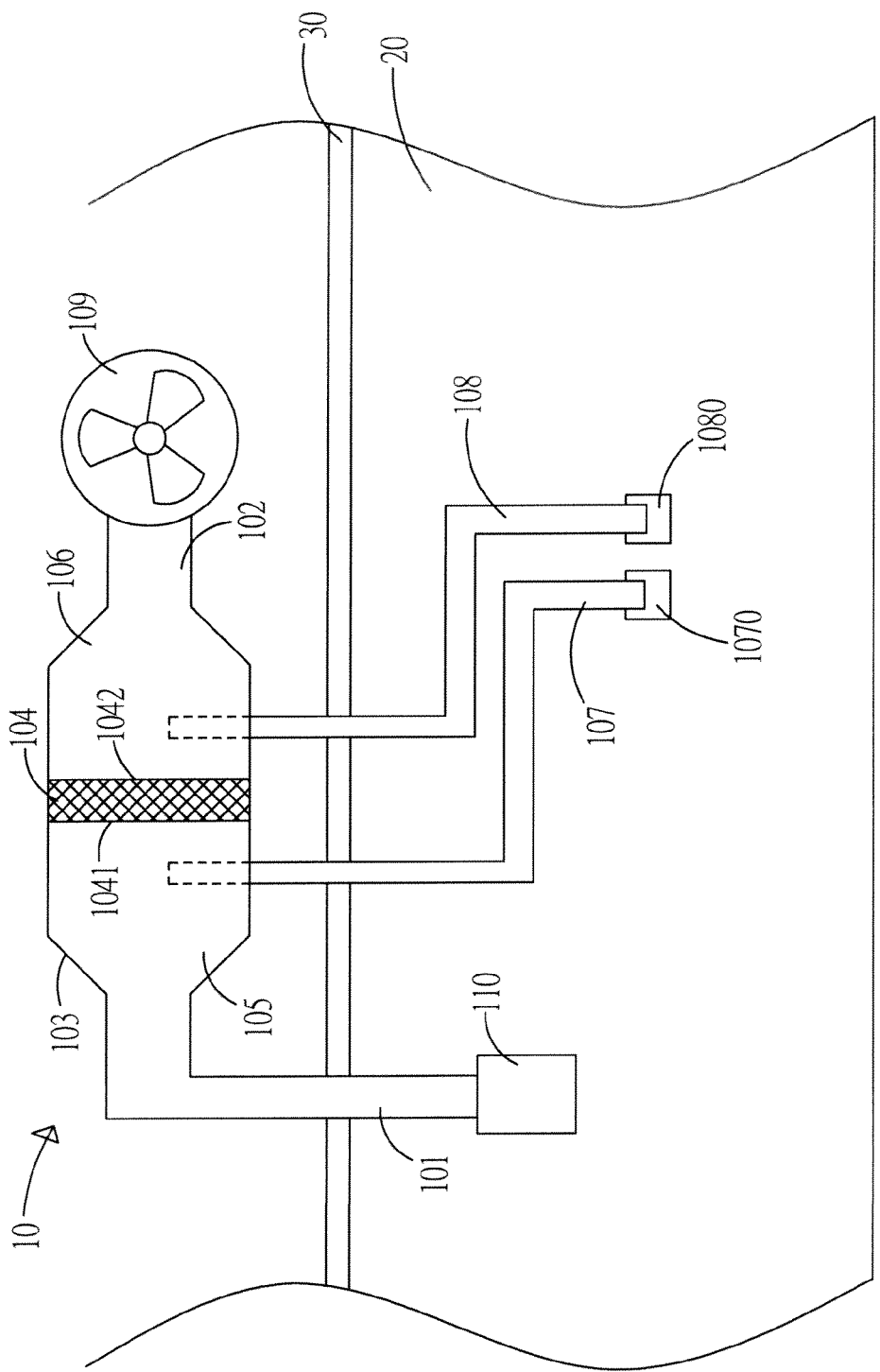
FIG. 1 shows a structural schematic diagram of the air filtering system according to a preferred embodiment of the present invention.

FIG. 1 shows a structural schematic diagram of the air filtering system according to a preferred embodiment of the present invention. As shown in the figure, the air filtering system capable of enhancing inspection convenience 10 is disposed in an operational space 20 for filtering the air in the space. The operational space 20 includes a hospital and a laboratory. For increasing space utilization, the air filtering system 10 can be disposed above a ceiling 30, namely, in the zoom within the ceiling 30.

The air filtering system capable of enhancing inspection convenience 10 according to the present invention comprises a housing 103, a filter 104, a first sampling tube 107, and a second sampling tube 108. On both sides of the housing 103, an intake 101 and a corresponding outtake 102 are disposed. The filter 104 is disposed in the housing 103, and has an intake surface 1041 and an outtake surface 1042 opposite to each other. The filter 104 divides the inner space of the housing 103 into a first sampling zone 105 and a second sampling zone 106. The first sampling zone 105 is formed between the intake 101 and the intake surface 1041; and the second sampling zone 106 is formed between the outtake 102 and the outtake surface 1042. A first end of the first sampling tube 107 is fixed on the housing 103, and communicates with the first sampling zone 105. Likewise, a first end of the second sampling tube 108 is fixed on the housing 103, and communicates with the second sampling zone 106. Beside, the first end of the first sampling tube 107 reaches into the first sampling zone 105 and the first end of the second sampling tube 108 reaches into the second sampling zone 106 for sampling the air uniformly in the first sampling zone 105 and the second sampling zone 106 of the air filtering system 10. By reaching the sampling tubes into the sample zones for sampling instead of sampling through the ventilators, uniform sampling can be achieved.

In addition, a second end of the first sampling tube 107 and a second end of the second sampling tube 108 are fixed on the wall of the operational space 20. That is to say, the first sampling tube 107 and the second sampling tube 108 extend to the surrounding wall of the operational space 20 from the air filtering system 10, and are fixed to the location where the inspection staffs can access with ease. The second end of the first sampling tube 107 and the second end of the second sampling tube 108 are disposed on the wall with the height under 200 centimeters. Besides, the fixing location of the second end of the first sampling tube 107 is adjacent to the fixing location of the second end of the second sampling tube 108. Thereby, the inspection convenience for the inspection staffs can be enhanced. When the inspection staffs need to sample, climbing up and down the stairs can be avoided, and hence preventing inconvenience and danger to the inspection staffs.

Moreover, the air filtering system 10 according to the present invention can be applied to the fields where exhaust gases are produced, such as biochemical laboratories, radiological medical laboratories, or high-tech factories. In these fields, the intake 101 of the air filtering system 10 can be connected with a smoke cabinet 110, which is used for containing the source of exhaust gases and for isolating the produced exhaust gases from the atmosphere. Besides, the air filtering system 10 according to the present invention can further comprise an exhaust fan 109 disposed at the outtake 102 for increasing the flow rate of the exhaust gases. However, the exhaust fan 109 is not necessary, because the exhaust gases can also be exhausted by diffusion.

The exhaust gases in the smoke cabinet 110 enter the first sampling zone 105 of the air filtering system 10 via the intake 101 by means of diffusion or the action of the exhaust fan 109. Next, the filter 104 filters out the germs, radioactive materials, or toxic materials. Then, the filtered gases enter the second sampling zone 106 and are exhausted to the atmosphere via the outtake 102.

In order to ensure the filtering function of the filter 104, the first sampling tube 107 samples the air before filtering from the first sampling zone 105 and performs analysis; and the second sampling tube 108 samples the air after filtering from the second sampling zone 106 and performs analysis. Then the two analysis results are compared for judging if the filtering function of the filter 104 complies with the requirements. Thereby, environmental pollution caused by exhausting germs, radioactive materials, or toxic materials to the atmosphere can be prevented.

In addition, the second end of the first sampling tube 107 and the second end of the second sampling tube 108 can include a first seal 1070 and a second seal 1080, respectively, for sealing the second end of the first sampling tube 107 and the second end of the second sampling tube 108. When the inspection staffs perform inspection, the first seal 1070 and the second seal 1080 can be opened for sampling, and hence enhancing sampling convenience.

Figure 2:
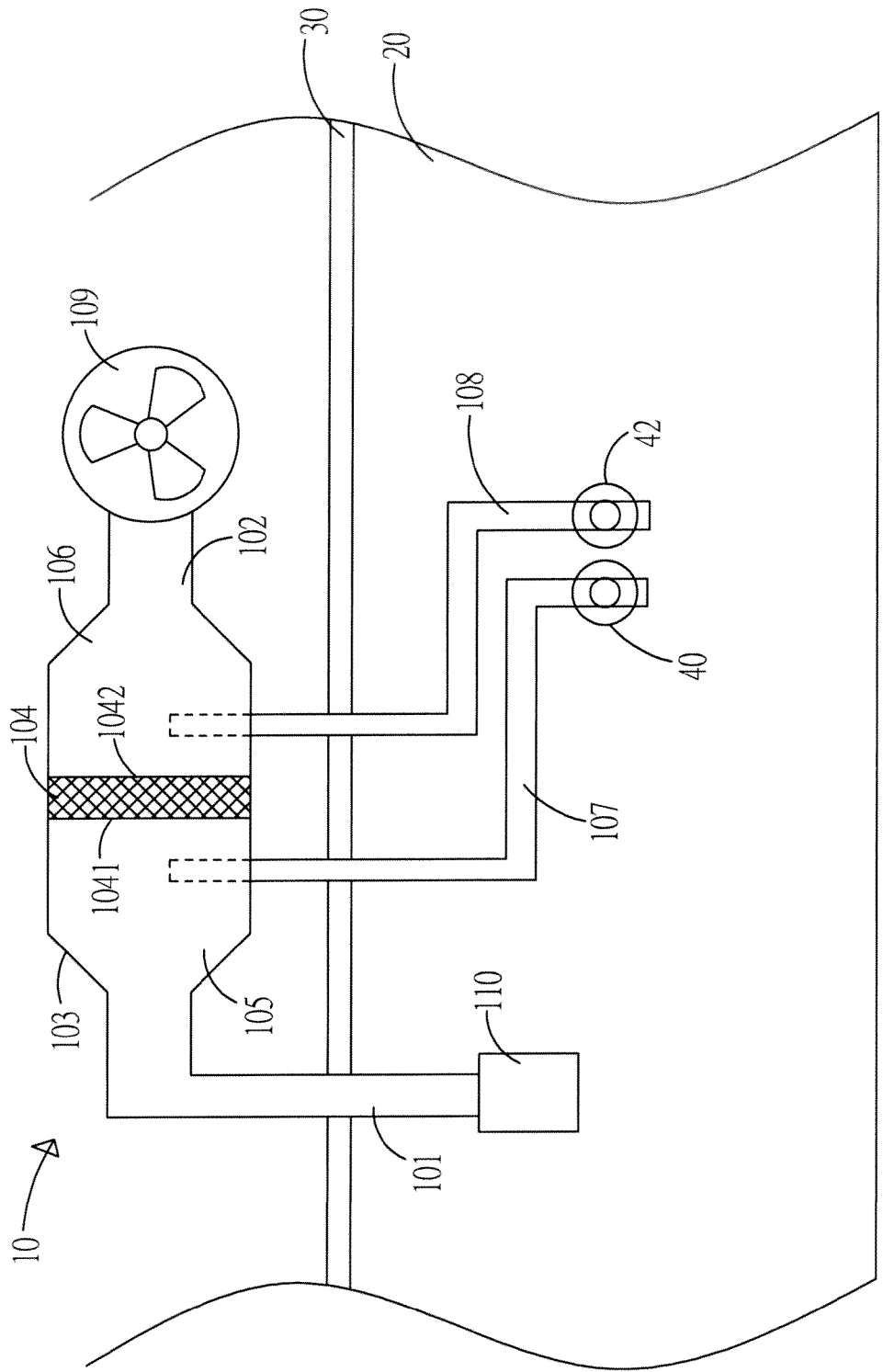
FIG. 2 shows a structural schematic diagram of the air filtering system according to another preferred embodiment of the present invention.

FIG. 2 shows a structural schematic diagram of the air filtering system according to another preferred embodiment of the present invention. As shown in the figure, the difference between the present preferred embodiment and the one in FIG. 1 is that the air filtering system capable of enhancing inspection convenience according to the present preferred embodiment further comprises a first control valve 40 and a second control valve 42. The first control valve 40 is disposed on the second end of the first sampling tube 107; the second control valve 42 is disposed on the second end of the second sampling tube 108. Thereby, when the inspection staffs are performing inspection, sampling can be achieved via the first and second control valves 40, 42, and hence enhancing sampling convenience.

Figure 3:
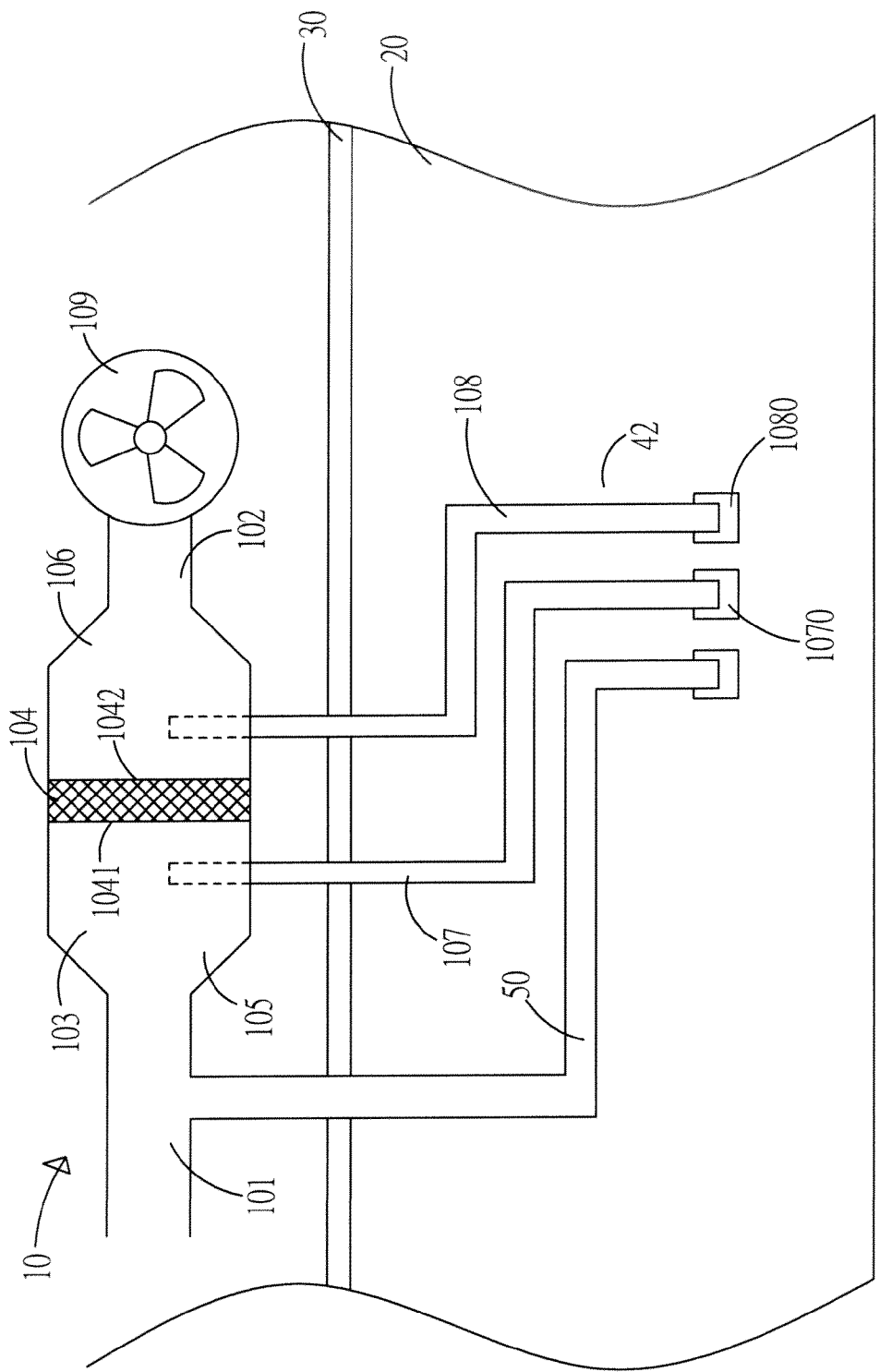
FIG. 3 shows a structural schematic diagram of the air filtering system according to another preferred embodiment of the present invention.

FIG. 3 shows a structural schematic diagram of the air filtering system according to another preferred embodiment of the present invention. As shown in the figure, the difference between the present preferred embodiment and the one in FIG. 1 is that the air filtering system capable of enhancing inspection convenience according to the present preferred embodiment further comprises a sample-releasing tube 50. A first end of the sample-releasing tube 50 is fixed on the housing 103 and communicates with the first sampling zone 105. Besides, the sample-releasing tube 50 is located in front of the first sampling tube 107. Thereby, the inspection gas can be injected into the air filtering system 10 through the sample-releasing tube 50. Then the inspection staffs can perform sampling via the first and second sampling tubes 107, 108 for inspecting if the air filtering system 10 is normal or not.

Furthermore, the distance between the first sampling tube 107 and the sample-releasing tube 50 is six times the diameter of the sample-releasing tube 50 so that the inspection gas can be distributed uniformly in the air filtering system 10, and hence increasing inspection accuracy. Besides, a second end of the sample-releasing tube 50 is fixed on the wall of the operational space 20. That is to say, the sample-releasing tube 50 extends to the surrounding wall of the operational space 20 from the air filtering system 10, and the second end of the sample-releasing tube 50 is fixed to the location where the inspection staffs can access with ease. In addition, the fixing location of the second end of the sample-releasing tube 50 is adjacent to the fixing location of the second end of the first sampling tube 107 and to the fixing location of the second end of the second sampling tube 108. Thereby, the inspection convenience for the inspection staffs can be enhanced. When the inspection staffs need to sample, climbing up and down the stairs can be avoided, and hence preventing inconvenience and danger to the inspection staffs.

To sum up, the air filtering system capable of enhancing inspection convenience according to the present invention is disposed in a ceiling. The first sampling tube and the second sampling tube according to the present invention are fixed on the wall of the operational space for enhancing inspection convenience for the inspection staffs. When the inspection staffs need to sample, climbing up and down the stairs can be avoided, and hence preventing inconvenience and danger to the inspection staffs.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. An air filtering system capable of enhancing inspection convenience, disposed in a ceiling, and comprising:

a housing, having an intake and a corresponding outtake on both ends of said housing;

a filter, disposed in said housing, having an intake surface and an outtake surface opposite to each other, dividing the inner space of said housing into a first sampling zone and a second sampling zone, said first sampling zone formed between said intake and said intake surface, and said second sampling zone formed between said outtake and said outtake surface;

a first sampling tube, a first end of said first sampling tube fixed on said housing and communicating with said first sampling zone; and a second sampling tube, a first end of said second sampling tube fixed on said housing and communicating with said second sampling zone;

a smoke cabinet, connected with the intake and the first sampling zone, said smoke cabinet isolate produced exhaust gases from atmosphere, the produced exhaust gases are received from the intake and entered to the first sampling zone;

wherein a second end of said first sampling tube and a second end of said second sampling tube are both fixed on a wall.

2. The air filtering system capable of enhancing inspection convenience of claim 1, and further comprising a sample-releasing tube, a first end of said sample-releasing tube fixed on said housing, communicating with said first sampling zone, and located in front of said first sampling tube.

3. The air filtering system capable of enhancing inspection convenience of claim 2, wherein the distance between said first sampling tube and said sample-releasing tube is six times the diameter of said sample-releasing tube.

4. The air filtering system capable of enhancing inspection convenience of claim 2, wherein a second end of said sample-releasing tube is fixed on the wall.

5. The air filtering system capable of enhancing inspection convenience of claim 4, wherein said second end of said sample-releasing tube is adjacent to said second ends of said first sampling tube and said second sampling tube.

6. The air filtering system capable of enhancing inspection convenience of claim 4, and further comprising a control valve, disposed on said second end of said sample-releasing tube.

7. The air filtering system capable of enhancing inspection convenience of claim 1, wherein said second end of said first sampling tube is adjacent to said second end of said second sampling tube.

8. The air filtering system capable of enhancing inspection convenience of claim 1, and further comprising a control valve, disposed on said second end of said first sampling tube.

9. The air filtering system capable of enhancing inspection convenience of claim 1, and further comprising a control valve, disposed on said second end of said second sampling tube.

10. The air filtering system capable of enhancing inspection convenience of claim 1, and further comprising an exhaust fan, communicating with said outtake.

\* \* \* \* \*